(12) United States Patent
Chandrashekhara et al.

(10) Patent No.: US 11,397,528 B2
(45) Date of Patent: Jul. 26, 2022

(54) CONSISTENT IO PERFORMANCE ON UNDEFINED TARGET DEVICES IN A CASCADED SNAPSHOT ENVIRONMENT

(71) Applicant: EMC IP HOLDING COMPANY LLC, Hopkinton, MA (US)

(72) Inventors: Sandeep Chandrashekhara, Shrewsbury, MA (US); Michael Ferrari, Douglas, MA (US); Jeffrey Wilson, Franklin, MA (US)

(73) Assignee: Dell Products, L.P., Hopkinton, MA (US)

( * ) Notice: Subject to any disclaimer, the term of this patent is extended or adjusted under 35 U.S.C. 154(b) by 174 days.

(21) Appl. No.: 17/072,133

(22) Filed: Oct. 16, 2020

(65) Prior Publication Data

US 2022/0121374 A1    Apr. 21, 2022

(51) Int. Cl.
*G06F 3/06* (2006.01)

(52) U.S. Cl.
CPC ............ *G06F 3/0613* (2013.01); *G06F 3/067* (2013.01); *G06F 3/0619* (2013.01); *G06F 3/0631* (2013.01); *G06F 3/0653* (2013.01); *G06F 3/0659* (2013.01)

(58) Field of Classification Search
CPC .... G06F 3/0613; G06F 3/0619; G06F 3/0631; G06F 3/0653; G06F 3/0659; G06F 3/067
See application file for complete search history.

*Primary Examiner* — Charles Rones
*Assistant Examiner* — Han V Doan
(74) *Attorney, Agent, or Firm* — Anderson Gorecki LLP

(57) ABSTRACT

A snapshot for use in a cascaded snapshot environment includes a device level source sequence number and a Direct Image Lookup (DIL) data structure. The device level source sequence number indicates the level of the snapshot in the cascade, and the snapshot DIL indicates the location of the data within the snapshot cascade. A target device for use in the cascaded snapshot environment includes a device level target sequence number, a track level sequence data structure, and a DIL. When the target device is linked to a snapshot, the device level target sequence number is incremented, which invalidates all tracks of the target device. The snapshot DIL is copied to the target device, but a define process is not run on the target device such that the tracks of the target device remain undefined. IO operations use the device level target sequence number to identify data on the target device.

19 Claims, 7 Drawing Sheets

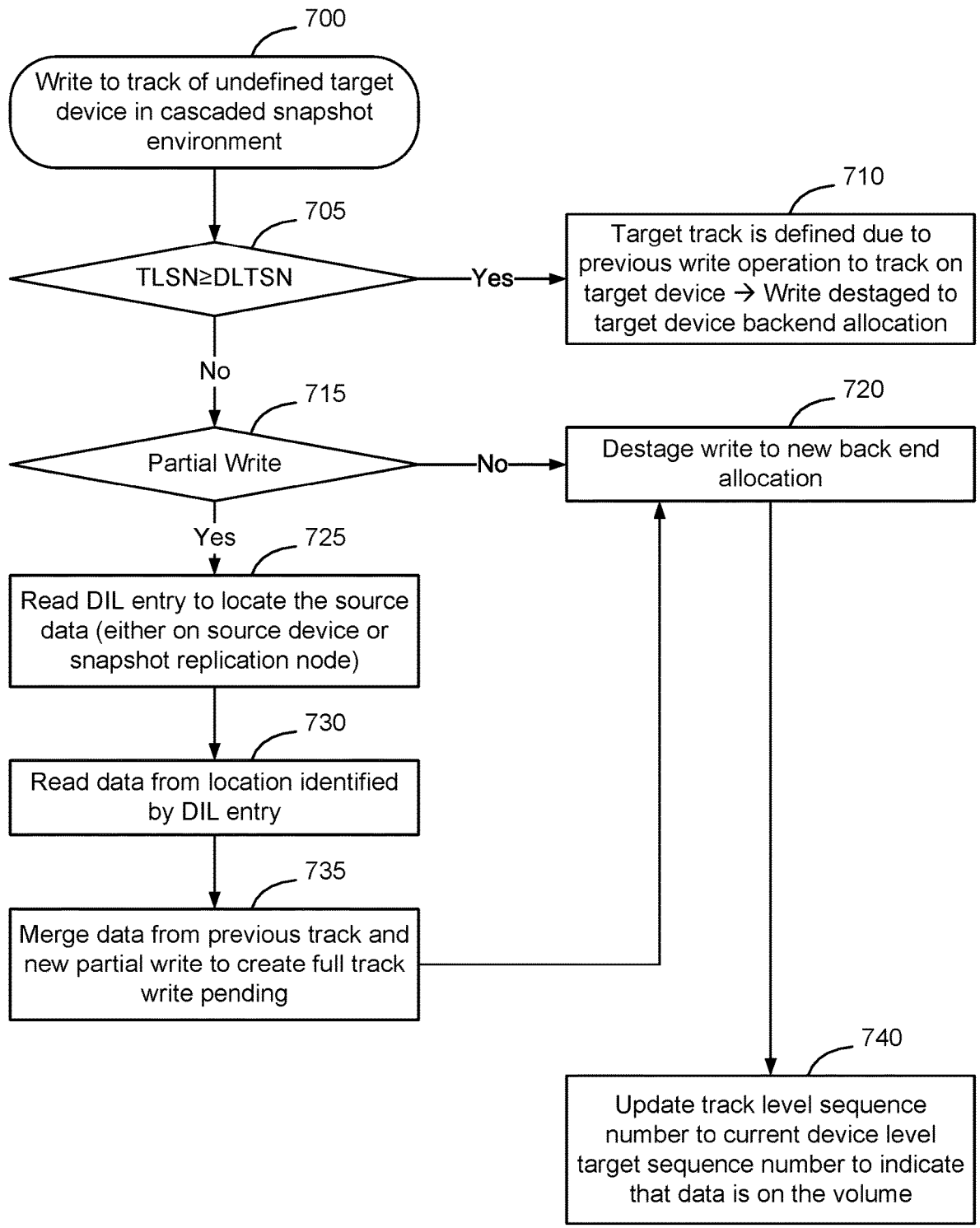

CONSISTENT IO PERFORMANCE ON UNDEFINED TARGET DEVICES IN A CASCADED SNAPSHOT ENVIRONMENT

FIELD

This disclosure relates to computing systems and related devices and methods, and, more particularly, to method and apparatus for enabling consistent IO performance on undefined target devices in a cascaded snapshot environment.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

A snapshot for use in a cascaded snapshot environment includes a device level source sequence number and a direct image lookup data structure. The device level source sequence number indicates the level of the snapshot in the cascade, and the direct image lookup data structure indicates the location of the data within the cascade where the tracks of data are located. A target device for use in the cascaded snapshot environment includes a device level target sequence number, a track level sequence data structure, and a direct image lookup data structure. When the target device is linked to a snapshot, the device level target sequence number is incremented, which invalidates all tracks of the target device. The direct image lookup of the snapshot is copied from the snapshot to the target device, but a define process is not run on the target device such that the tracks of the target device remain undefined.

Read and write operations on the cascaded target device use the track level sequence numbers to validate the current data on the target. If a previous write has occurred on a track, the track level sequence number will indicate that the track is defined on the target device. Otherwise, once it is known that the track is undefined, the current DIL is used to locate the source data for the undefined target. The DIL provides consistent predictable direct lookup of the target location of backend allocations or source data at any depth in the snapshot target chain.

BRIEF DESCRIPTION OF THE DRAWINGS

FIG. 7 is a flow chart of a method of implementing a write operation on an undefined target device in a cascaded snapshot environment, according to some embodiments.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
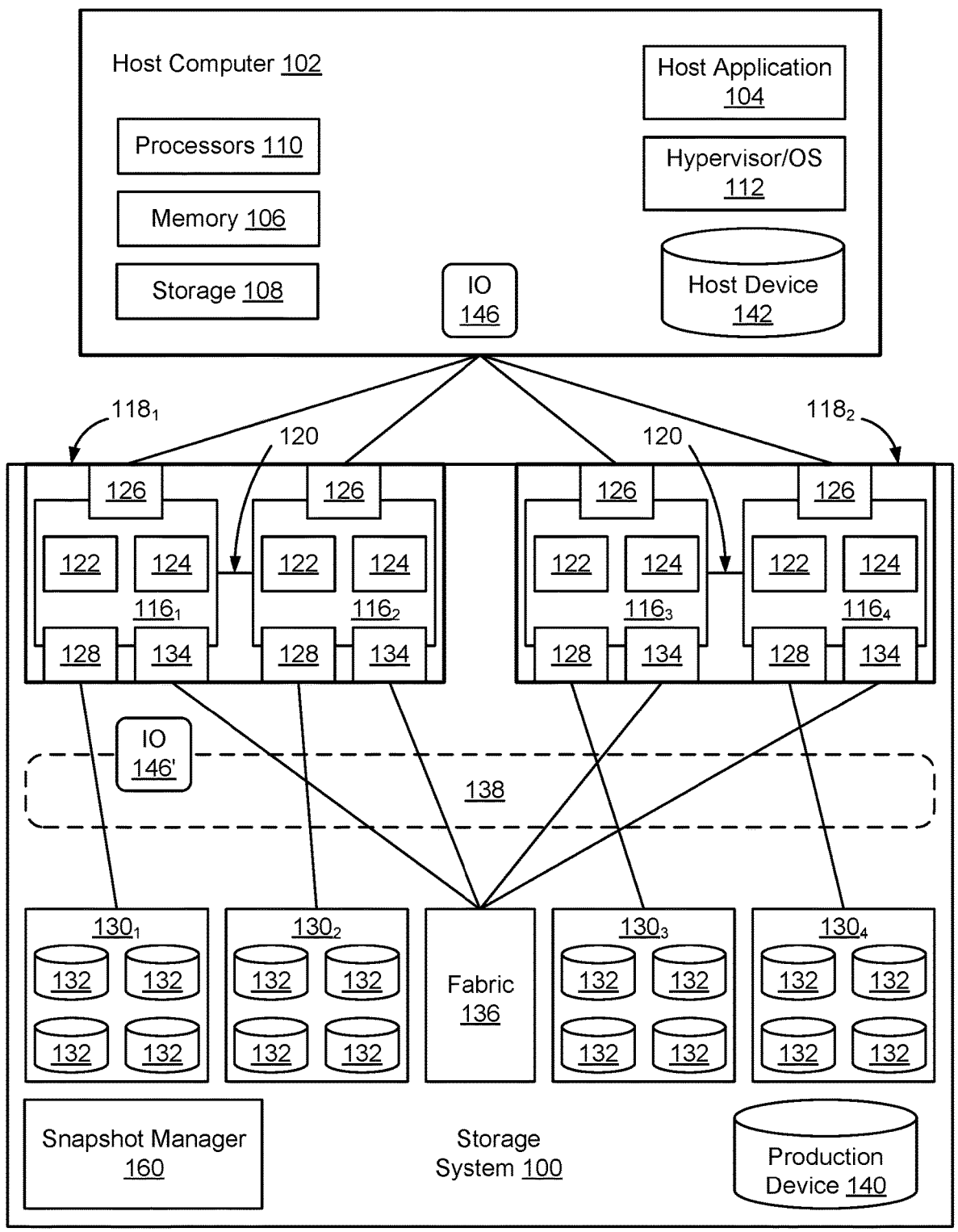
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. One example of a host application 104 is a storage system management application 150, which is discussed in greater detail below.

In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs (Central Processing Units), GPUs (Graphical Processing Units), and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM, and in some embodiments is used to implement a cache for processors 122. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe (Peripheral Component Interconnect express) bus, or may be connected to the compute nodes $116_1$-$116_4$, for example, by an IB (InfiniBand) bus or IB fabric switch 136.

In some embodiments, each compute node 116 also includes one or more CAs (Channel Adapters) 134 for communicating with other compute nodes 116 directly or via an interconnecting fabric 136. An example interconnecting fabric may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, databases, and storage system management application 150.

Logical storage devices are created and presented to the host application 104 for storage of the host application data. For example, as shown in FIG. 1, in some embodiments a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output) command 146 from the host application 104 to the host device 142, the hypervisor/OS 112 determines whether the IO 146 can be serviced by accessing the host computer memory 106. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, then the data is temporarily copied into the shared global memory 138 from the managed drives 132 and sent to the host application 104 via one of the compute nodes $116_1$-$116_4$. In the case where the IO 146 is a write command, in some embodiments the storage system 100 copies a block being written into the shared global memory 138, marks the data as dirty, and creates new metadata that maps the address of the data on the production device 140 to a location to which the block is written on the managed drives 132. Writing data from shared global memory to managed drives 132 is referred to herein as "destaging" the data. The shared global memory 138 may enable the production device 140 to be reachable via all of the compute nodes $116_1$-$116_4$ and paths, although the storage system 100 can be configured to limit use of certain paths to certain production devices 140.

Not all volumes of data on the storage system are accessible to host computer 104. When a volume of data is to be made available to the host computer, a logical storage volume, also referred to herein as a TDev (Thin Device), is linked to the volume of data, and presented to the host computer 104 as a host device 142. For example, to protect the production device 140 against loss of data, a snapshot (point in time) copy of the production device 140 may be created and maintained by the storage system 100. If the host computer 104 needs to obtain access to the snapshot copy, for example for data recovery, the snapshot copy may be linked to a logical storage volume (TDev) and presented to the host computer 104 as a host device 142. The host computer 102 can then execute read/write IOs on the TDev to access the data of the snapshot copy.

A "snapshot," as that term is used herein, is a copy of a volume of data as that volume existed at a particular point in time. A snapshot of a production device 140, accordingly, is a copy of the data stored on the production device 140 as the data existed at the point in time when the snapshot was created. A snapshot can be either target-less (not linked to a TDev) or may be linked to a target TDev when created. When a snapshot of a production volume is created, the snapshot may include all of the data of the production volume, or only the changes to the production volume that have occurred since the previous snapshot was taken. Snapshots can be used, for example, for backups, decision support, data warehouse refreshes, recovery from logical corruption, or any other process that requires parallel access to production data.

Figure 2:
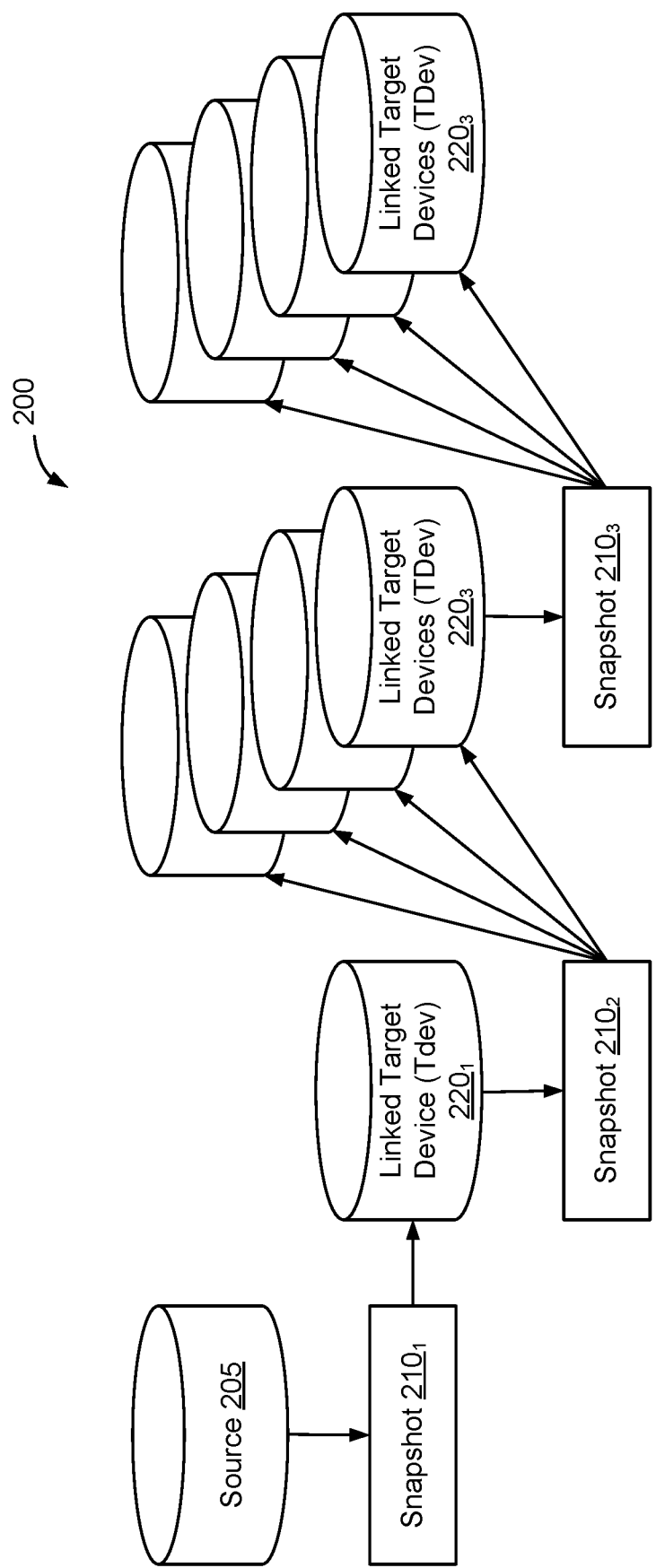
FIG. 2 is a functional block diagram of an example set of cascaded snapshots linked to sets of undefined target devices, according to some embodiments.

A snapshot is a mirror of a data set at a particular moment, also known as an instant copy, which is a fully available copy of the data set. In a virtual machine application scenario, a snapshot can be used as a virtual machine carrier. In this case, the snapshot is also able to be used to implement read and write operations. To save the data in the snapshot, it is possible to take a snapshot of the snapshot, that is, a cascaded snapshot. One example of a cascading snapshot environment is shown in FIG. 2. As shown in FIG. 2, snapshot $210_1$ is a snapshot of the source 205 logical volume (LUN), and snapshot $210_2$ is a snapshot of snapshot $210_1$. Thus, snapshot $210_2$ retains the contents of snapshot $210_1$. The user can modify the snapshot $210_1$ without worrying about the original snapshot content being lost. Similarly, the snapshot $210_3$ is a snapshot of the snapshot $210_2$. The user can also modify the snapshot $210_2$, and the modified content may be different from the modified content of the snapshot $210_1$. Snapshot $210_2$ is a sub-snapshot of the snapshot $210_1$ and is the parent snapshot of the snapshot $210_3$.

It is possible to take a snapshot of a production volume, link a thin device to the snapshot, and then take a snapshot of the linked target. As used herein, the term "cascading of snapshots" will be used to refer to taking a snapshot of a linked target, and linking a target device to the snapshot of the linked target. FIG. 2 shows an example of cascading snapshots in a cascaded snapshot environment 200. As shown in FIG. 2, in this example a first snapshot $210_1$ of source 205 was created and linked to a target device $220_1$. A snapshot $210_2$ of the target device $220_1$ was then created and linked to a set of target devices $220_2$. A snapshot $210_3$ of one of the target devices $220_2$ was then created and linked to a set of target devices $220_3$. The number of levels of cascaded snapshots can extend to any desired depth depending on the implementation.

There are many reasons for using cascaded snapshots. One example reason is for testing and debug purposes. For example, it may be necessary to run a set of test scripts on a system application, which requires a volume of data. Since the tests can result in changing the data, e.g. deleting files, adding files, updating files, etc. it is preferable to not implement those tests on the actual production volume or on any of the snapshots that need to be maintained to protect the integrity of the production volume. Accordingly, as shown in FIG. 2, there are instances where it would be preferable to create cascaded snapshots $210_2$, $210_3$, etc., link those snapshots to a set of target devices $220_2$, $220_3$, and run the tests using those target devices. Since operations on the cascaded snapshots do not affect the source 205, it is possible to allow the tests to make any changes to the data of the cascaded snapshots and, when the tests are over, simply delete the cascaded snapshots.

When a target device is linked to a snapshot, it is possible to run a "define" process on the target device to cause the tracks of the target device to point to the correct set of backend allocations where the data is stored. However, running the define process consumes processor resources on the storage system 100, and also results in creation of metadata which must be stored in the storage system metadata tables. Since both processor resources and the amount of storage available for the metadata tables is limited, it is preferable to not run the "define" process on the target devices. As used herein, the term "undefined target device" is used to refer to a target device that does not have its tracks defined, such that the "define" process is not used on the target device when the target device is linked to a snapshot in the cascaded snapshot environment 200.

Although the use undefined target devices in a cascaded snapshot environment 200 could be beneficial, conventionally the use of undefined target devices resulted in inconsistent and unpredictable storage system IO performance, which limited the use of undefined target devices in a cascaded snapshot environment 200. For example, the use of cascaded snapshots and presenting the cascaded snapshots to multiple inter-dependent targets conventionally has been inefficient and memory intensive, resulting in unpredictable and inconsistent IO performance. This was due, at least in part, to the overhead and metadata required to traverse each level of the cascade to lookup source snapshot data for the relevant Local Block Addresses (LBAs).

Figure 3:
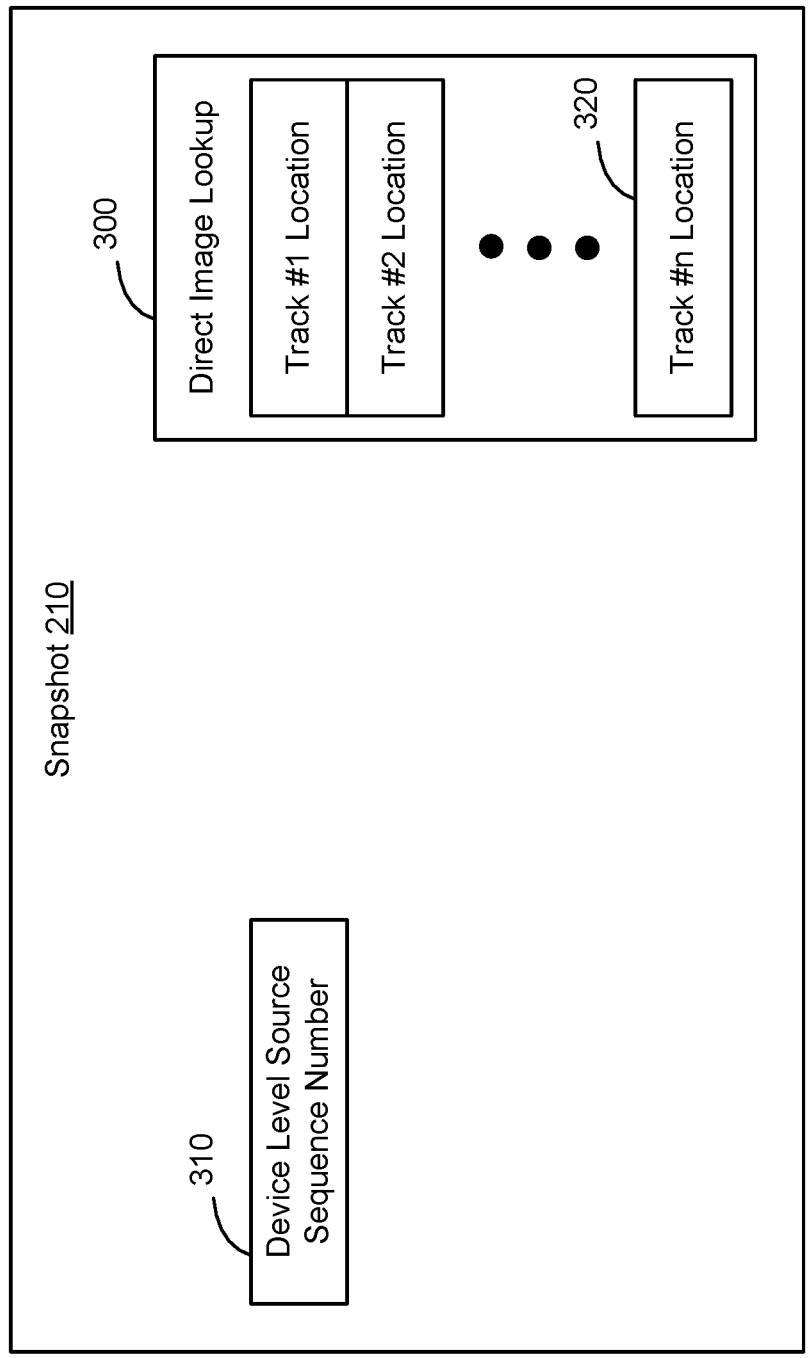
FIG. 3 is a functional block diagram of an example snapshot for use in a cascaded snapshot environment, according to some embodiments.
Figure 4:
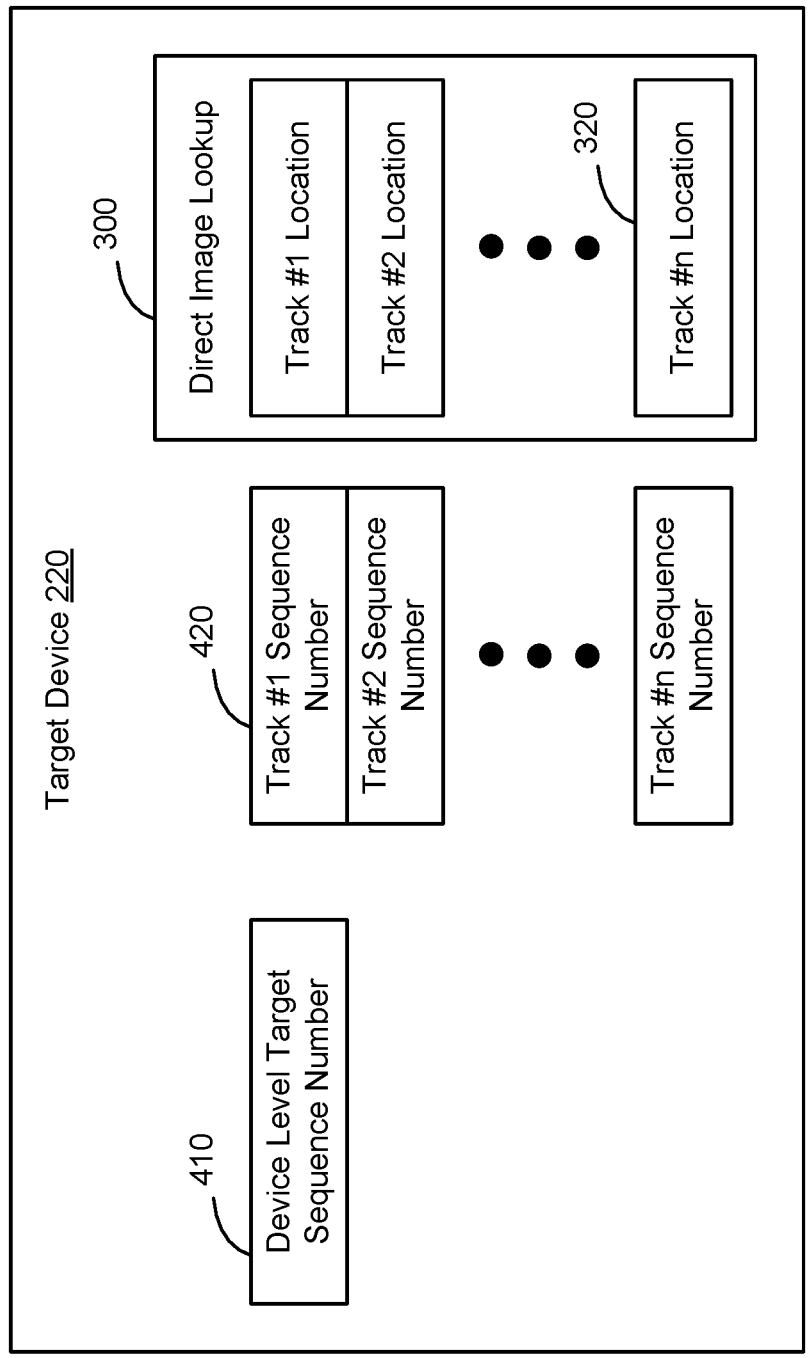
FIG. 4 is a functional block diagram of an example target device for use in a cascaded snapshot environment, according to some embodiments.

FIG. 3 is a functional block diagram of an example snapshot for use in a cascaded snapshot environment 200, and FIG. 4 is a functional block diagram of an example undefined target device for use in a cascaded snapshot environment 200. As shown in FIG. 3, in some embodiments each snapshot 210 in a cascaded snapshot environment 200 includes a direct image lookup data structure 300, and a device level source sequence number 310. The direct image lookup data structure 300 identifies the locations of the data within the cascaded snapshot environment 200, and is copied from the previous source/snapshot when the snapshot is created. The device level source sequence number 310 is incremented monotonically each time a snapshot of a snapshot is created, and identifies the location of the snapshot within the cascaded snapshot environment 200.

In some embodiments, the device level source sequence number 310 is used to define the level of the snapshot in the snapshot cascade of the cascaded snapshot environment 200. The device level source sequence number 310 monotonically increases as new snapshots are created and added to the snapshot cascade. Thus, for example, the source 205 might have a device level source sequence number of 0, snapshot $210_1$ might have a device level source sequence number of 1, etc. By monotonically increasing the device level source sequence number 310, it is possible to uniquely identify each snapshot within the cascaded snapshot environment 200 and properly manage the order of operations.

In some embodiments, a track is the minimum granularity for preserving point-in-time data. A track is a fixed-size unit of storage capacity that is used by the storage array for processing IO commands and other functions. As shown in FIGS. 3 and 4, the DIL data structure 300 includes a separate entry 320 for each track of the target device. For example, and without limitation, each entry in the DIL data structure 300 may correspond to a track of data on the associated target device. Each utilized DIL entry 320 includes a source volume identifier, e.g. identifying which snapshot in the cascaded snapshot environment 200 contains the data associated with the respective track.

When a snapshot 210 is created, the device level source sequence number 310 is incremented by one, and the current DIL data structure 300 is copied to the new snapshot 210.

At least one direct index lookup (DIL) data structure 300 is associated with each represented storage object. In the illustrated example, the DIL data structure 300 is implemented as a table, in which each entry represents the current location of data for each track. Other data structures may be used as well, and the use of a table is illustrated merely for ease of explanation. In some embodiments, each DIL entry 320 includes the track number of the device 220 and the location of the data associated with the track. For example, the location of the data may be on the target device, on the snapshot linked to the target device, on another snapshot 210 in the cascaded snapshot environment 200, or on the source 205.

As shown in FIG. 4, the target device 220 includes a device level target sequence number 410, a track level sequence number data structure 420, and a direct image lookup data structure 300. When a snapshot 210 is linked to a target device 220, the device level target sequence number 410 on the target device 220 is incremented. As discussed below, if the track level sequence number of a particular track is higher than or equal to the device level target sequence number 410, the data associated with the track resides on the target device. Incrementing the device level target sequence number, when the target device 220 is linked to a snapshot 210, thus has the effect of invalidating the entire target device. Further, a define process is not run on the target device, such that the tracks of the target device remain undefined when the target device 220 is linked to the snapshot 210 in the cascaded snapshot environment 200.

When the target device 220 is linked to the snapshot 210, the snapshot direct image lookup data structure 300 is copied to the target device's current direct image lookup data structure 300. Read and write operations on the cascaded target device 210 uses a track level sequence number 420 to validate the current data on the target device. If the track on the target device 220 is undefined, the target devices' DIL 300 is used to quickly locate the source data for the undefined target track. The DIL 300 provides a consistent and predictable direct lookup of the target location of backend allocations or source data at any depth in the snapshot target chain.

As shown in FIG. 4, the linked target devices 220 in the snapshot cascade are numbered using a device level target sequence number 410. The device level target sequence number 410, like the device level source sequence number 310, monotonically increases as snapshots 210 are linked or relinked to the target device 220. When a target device 220 is linked to the snapshot 210, the snapshot DIL 300 is copied to the target's current DIL 300.

As shown in FIG. 4, the target device also includes a track level sequence number data structure 420 containing track level sequence numbers indicating whether a write has occurred on the track of the target device 220. In some embodiments, a respective track level sequence number associated with a given track is updated to the current device level target sequence number 410 when a write to the track occurs. The current DIL is then updated to indicate that the data associated with the track is on the target device. If a subsequent read on the track occurs, the target device 220 can determine that the track is defined by reading the value of the associated track level sequence number in the track level sequence number data structure 420. If a subsequent write on the track occurs, the target device 220 can use the same backend allocation to destage the new write operation.

Figure 5:
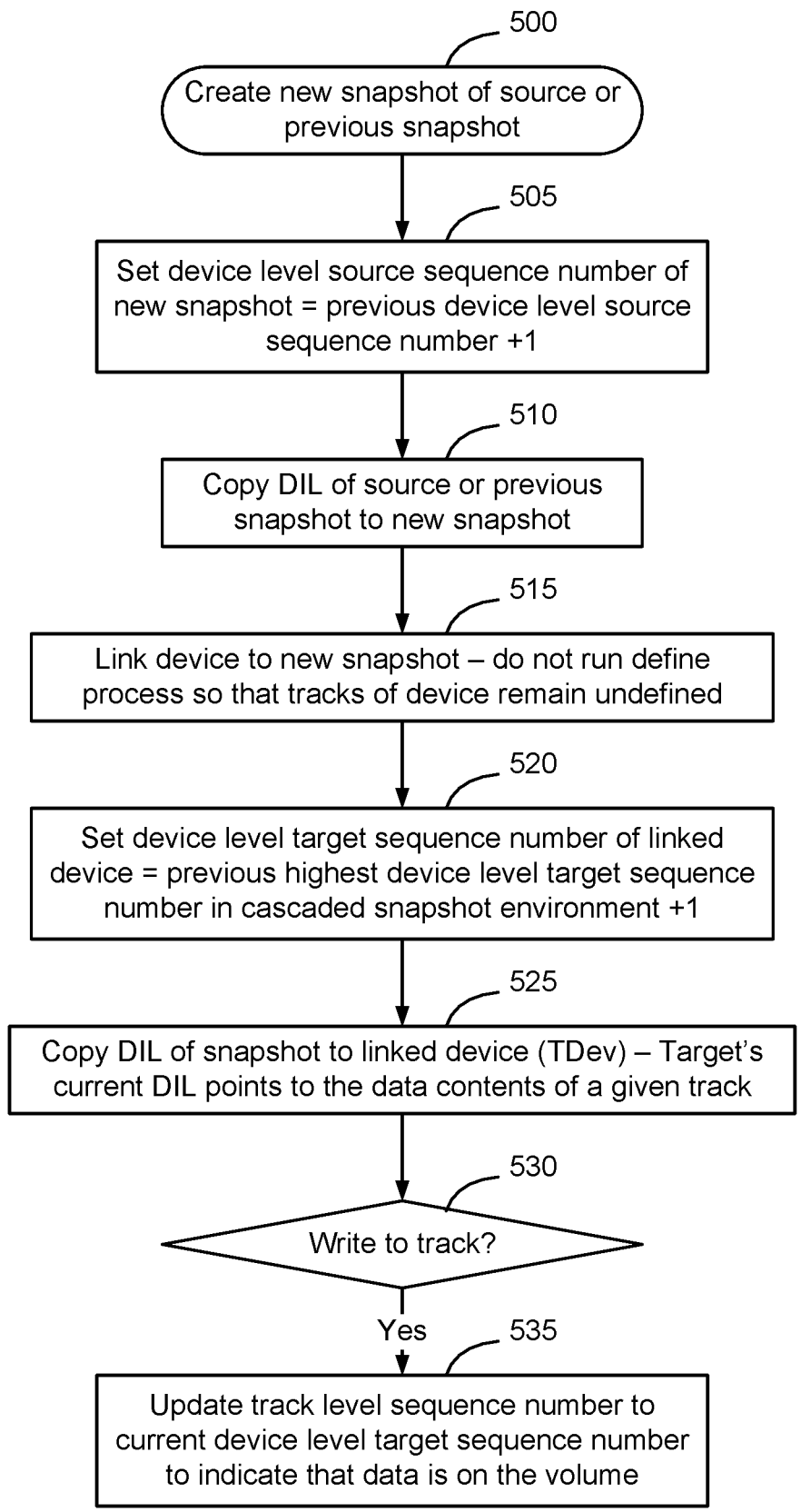
FIG. 5 is a flow chart of a method of creating a snapshot and linking an undefined target device to the snapshot in a cascaded snapshot environment, according to some embodiments.

FIG. 5 is a flowchart of a method of creating a snapshot and linking the snapshot to an undefined target device in a cascaded snapshot environment 200. As described in greater detail herein, by using the device level source sequence number 310, device level target sequence number 410, track level sequence numbers 420, and direct image lookup tables 300, it is possible to provide consistent predictable direct lookup of the target location of backend allocations or source data at any depth in the cascaded snapshot environment 200, without requiring a define process to be used to define the tracks of the linked target devices. By removing the variability of latency associated with reading data in the cascaded snapshot environment 200, it is possible to use undefined target devices thus greatly reducing the processing and metadata requirements associated with implementing the cascaded snapshot environment.

As shown in FIG. 5, the method starts with creating a new snapshot of the source 205 or of a previous snapshot 210 in the cascaded snapshot environment 200 (block 500). As shown in FIG. 3, each snapshot 210 includes a device level source sequence number 310. When the new snapshot is created, the device level source sequence number 310 of the new snapshot is increased by one from the previous snapshot. Accordingly, in some embodiments the device level source sequence number of the new snapshot is set to be equal to the device level source sequence number of the previous snapshot plus one (block 505). Additionally, the DIL data structure of the previous snapshot or of the source is copied to the new snapshot (block 510).

The snapshot is then linked or relinked to a target device 220 (block 515). Notably, when this occurs, a define process is not run on the target device 220 such that the tracks of the target device 220 remain undefined. Linking the target device 220 to the snapshot causes the device level target sequence number 410 of the linked target device 220 to be monotonically incremented. For example, in some embodiments the device level target sequence number 410 of the linked device 220 is set to be equal to the value of the device level target sequence number of the most recently linked target device in the cascaded snapshot environment 200 plus one (block 520). Incrementing the device level target sequence number 410 ensures that the device level target sequence number will be larger than each of the track level sequence numbers in the track level sequence number data structure 420. The content of the DIL 300 of the snapshot 210 is also copied to the DIL 300 of the target device 220 (block 525). The target device's current DIL therefore points to the location of the data associated with the tracks, and can be used to locate the data associated with a read operation on a given track on the target device even though the tracks of the target device remain undefined.

If a write occurs on a particular track of the target device 220 (a determination of YES at block 530), the track level sequence number of the respective track is updated to correspond to the device level target sequence number 410

(block 535). This indicates that the data is on the target device, i.e. that the track is defined on the target device. Accordingly, subsequent read and write operations on the track on the target device will occur on the backend allocation associated with the track.

Figure 6:
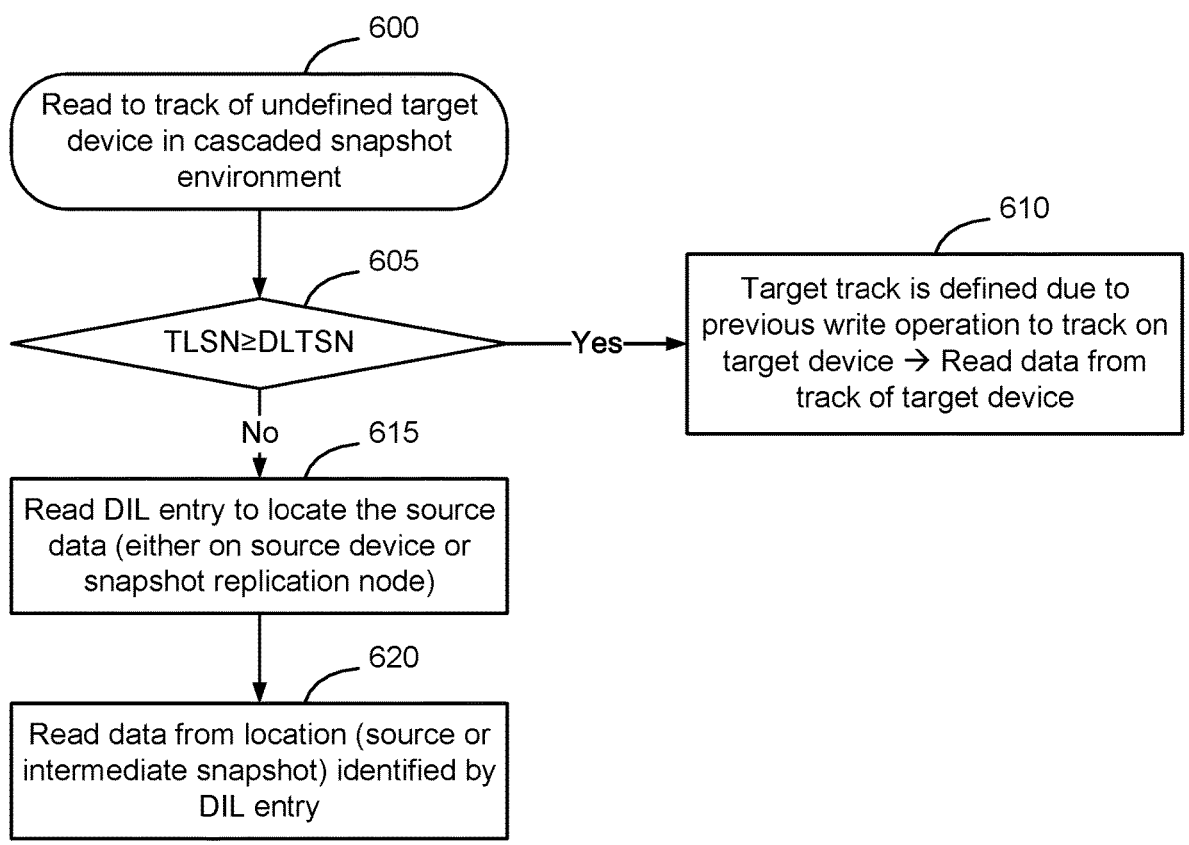
FIG. 6 is a flow chart of a method of implementing a read operation on an undefined target device in a cascaded snapshot environment, according to some embodiments.

FIG. 6 is a flow chart of a process of implementing a read operation on a track of an undefined target device 220 in a cascaded snapshot environment 200, according to some embodiments. As shown in FIG. 6, when a read operation to cascaded target track is received (block 600), a comparison is implemented between the track level sequence number (TLSN) of the track that is to be read and the device level target sequence number (DLTSN) of the target device 220 (block 605). If the track level sequence number of the track is greater than or equal to the device level target sequence number 410 of the target device 220 (a determination of YES at block 605), then the target track is defined on the target device due to a previous write operation to the track. Accordingly, the track is defined and the read operation is able to be implemented on the target device directly from its own backend allocations (610).

If track level sequence number is less than the device level target sequence number 410 of the target device (a determination of NO at block 605), the target device 220 reads the DIL entry 320 associated with the track to locate the source of the data. The data can either be on the source 205 or on one of the intermediate snapshots 210. Once the location of the source of data has been determined, the target device can read the requested data from the source/snapshot within the cascade identified by the DIL entry 320, without traversing the snapshot cascade in the cascaded snapshot environment 200. Accordingly, by reading the DIL 300 to locate the source of the data (source 205 or intermediate snapshot 210), it is possible to implement read operations on cascaded snapshots of a cascaded snapshot environment 200 in a consistent manner. Specifically, by using the DIL 300 to locate the data, it is possible to implement a read on a cascaded snapshot using a consistent predictable direct lookup of the location of backend allocations regardless of the depth of snapshot in the cascaded snapshot environment 200.

FIG. 7 is a flow chart of a process of implementing a write operation on a track of a target device in a cascaded snapshot environment 200. As shown in FIG. 7, when a write operation to cascaded target track is received (block 700), a comparison is implemented between the track level sequence number (TLSN) and the device level target sequence number (DLTSN) of the target device 220 (block 705). If the track level sequence number of the track is greater than or equal to the device level target sequence number 410 of the target device 220 (a determination of YES at block 705), then the target track is defined on the target device due to a previous write operation to that track on the target device. Accordingly, the write is destaged to the target devices' backend allocation associated with the track (710).

If the track level sequence number is less than the device level target sequence number 410 (a determination of NO at block 705), manner in which the write is implemented depends on whether the write is a partial write or a full write. As shown in FIG. 7, in some embodiments the target device 220 determines whether the write operation is a partial write operation (block 715). If the write is not a partial write operation (a determination of NO at block 715) the target device performs an asynchronous write destage to a new backend allocation (block 720). The track level sequence number of the track is then updated to the value of the device level target sequence number 410 to indicate that data is on the volume (block 740).

If the write is a partial write operation (a determination of YES at block 715), in some embodiments data is read from the current backend allocation (as pointed at by the current DIL entry), and the partial write is merged with the previous data to enable the write operation to be implemented as a full track write pending, before being destaged to a new backend allocation. This prevents data associated with a given track from being split between two or more backend allocations. Accordingly, as shown in FIG. 7, the target device 220 will read the DIL entry associated with the track to locate the source of the data, which will be either on the source 205 or another snapshot 210 in the cascaded snapshot environment 200 (block 725). The target device 220 will then read the data from the location identified by the DIL entry (block 730) and merge the data from the previous track and new partial write to create a full track write pending (block 735). The target device then performs an asynchronous write destage of the merged data to a new backend allocation (block 720). The track level sequence number of the track is then updated to the value of the device level target sequence number 410 to indicate that data is on the volume (block 740).

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for providing consistent IO performance in a cascaded snapshot environment, the computer program including a set of instructions which, when executed by a computer, cause the computer to perform a method comprising the steps of:
   generating a new snapshot of a previous snapshot of the cascaded snapshot environment, the previous snapshot having a device level source sequence number and a direct image lookup data structure;
   copying the direct image lookup data structure from the previous snapshot to the new snapshot;
   setting a value of a device level source sequence number of the new snapshot to be greater than the device level source sequence number of the previous snapshot;
   linking an undefined target device to the new snapshot;
   copying the direct image lookup data structure from the new snapshot to the undefined target device; and
   setting a value of a device level target sequence number of the undefined target device to be greater than device level target sequence numbers of other target devices in the cascaded snapshot environment.

2. The non-transitory tangible computer readable storage medium of claim 1, wherein the target device has a set of tracks of storage capacity, and the direct image lookup data structure contains a respective direct image lookup entry for each track of the target device identifying a location of data associated with the track within the cascaded snapshot environment.

3. The non-transitory tangible computer readable storage medium of claim 2, wherein the location of data is either on a source volume or another snapshot of the cascaded snapshot environment.

4. The non-transitory tangible computer readable storage medium of claim 2, wherein the undefined target device further comprises a track level sequence number data structure containing a respective track level sequence number for each track of the target device.

5. The non-transitory tangible computer readable storage medium of claim 4, further comprising:
   receiving a read IO operation by the undefined target device on a selected track;
   comparing the track level sequence number for the selected track with the device level target sequence number of the undefined target device; and
   using the result of the comparison to determine whether data requested by the IO operation should be implemented by reading a back-end allocation of the undefined target device or by reading a location of the data identified by the respective direct image lookup entry.

6. The non-transitory tangible computer readable storage medium of claim 4, further comprising:
   receiving a write IO operation by the undefined target device on a selected track;
   comparing the track level sequence number for the selected track with the device level target sequence number of the undefined target device; and
   using the result of the comparison to determine whether data requested by the IO operation should be implemented on a previous a back-end allocation of the undefined target device or on a new back-end allocation of the undefined target device.

7. The non-transitory tangible computer readable storage medium of claim 6, further comprising changing the track level sequence number to equal the device level target sequence number to indicate that data of the selected track is on the undefined target device.

8. The non-transitory tangible computer readable storage medium of claim 6, further comprising determining whether the write IO operation is a partial write operation or a full write operation;
   in response to determining that the write IO operation is a full write operation, the method further comprising destaging the write operation to the new back-end allocation; and
   in response to determining that the write IO operation is a partial write operation, the method further comprising:
   reading a previous location of the previous data identified by the respective direct image lookup entry;
   merging the previous data and data associated with the write IO operation; and
   destaging the merged data to the new back-end allocation.

9. A cascaded snapshot environment, comprising:
   a set of snapshots, each snapshot having a device level source sequence number identifying a location of the snapshot within the cascaded snapshot environment and a Direct Image Lookup (DIL) data structure, each DIL data structure containing DIL entries for each track of data associated with the respective snapshot, each DIL entry identifying a location of data associated with a respective track within the cascaded snapshot environment; and
   an undefined target device linked to a first of the snapshots in the cascaded snapshot environment, the undefined target device having a device level target sequence number, a set of track level sequence numbers, and a copy of the DIL data structure of the first of the snapshots;
   the undefined target device containing control logic configured to:
   implement a read operation on a first track by comparing a respective track level sequence number value of the first track with the device level target sequence number to determine whether the data for the first track is on the undefined target device or not on the undefined target device; and
   in response to determining that the data for the first track is not on the undefined target device, use a respective DIL entry to locate the data for the first track within the cascaded snapshot environment.

10. The cascaded snapshot environment of claim 9, wherein the control logic is further configured to implement a write operation on a first track by comparing the respective track level sequence number value of the first track with the device level target sequence number to determine whether a write operation has previously been implemented on the first track of the undefined target device or has not previously been implemented on the first track of the undefined target device.

11. The cascaded snapshot environment of claim 10, wherein the control logic is further configured such that, in response to determining that a write operation has previously been implemented on the first track of the undefined target device, the write operation is implemented by destaging the write operation to a backend allocation associated with the previous write operation.

12. The cascaded snapshot environment of claim 10, wherein the control logic is further configured such that in response to determining that a write operation has not previously been implemented on the first track of the undefined target device, the write operation is implemented by destaging the write operation to a new backend allocation.

13. The cascaded snapshot environment of claim 12, wherein the control logic is further configured to change the respective track level sequence number value of the first track to equal the device level target sequence number to indicate that data of the selected track is on the undefined target device.

14. The cascaded snapshot environment of claim 12, wherein the control logic is further configured to determine whether the write operation is a partial track write operation or a full track write operation, and in response to determining that the write operation is a partial track write operation, the control logic is further configured to obtain previous data associated with the first track and merge the previous data of the first track with new data associated with the write operation prior to destaging the write operation to the new backend allocation.

15. A method of providing consistent read IO performance on undefined target devices in a cascaded snapshot environment, comprising:
   generating a new snapshot of a previous snapshot of the cascaded snapshot environment, the previous snapshot having a device level source sequence number and a direct image lookup data structure having entries identifying locations of tracks of data within the cascaded snapshot environment;
   copying the direct image lookup data structure from the previous snapshot to the new snapshot;
   setting a value of a device level source sequence number of the new snapshot to be greater than the device level source sequence number of the previous snapshot;
   linking an undefined target device to the new snapshot;
   copying the direct image lookup data structure from the new snapshot to the undefined target device;
   setting a value of a device level target sequence number of the undefined target device to be greater than device level target sequence numbers of other target devices in the cascaded snapshot environment; and
   implementing a read operation on a first track of the undefined target device either from a backend allocation of the undefined target device or a location identified by a respective direct image lookup entry, depending on a current value of a track level sequence number for the first track.

16. The method of claim 15, wherein the target device has a set of tracks of storage capacity, and the direct image lookup data structure contains a respective direct image lookup entry for each track of the target device identifying a location of data associated with the track within the cascaded snapshot environment.

17. The method of claim 16, wherein the location of data is either on the target device, a source volume, or another snapshot of the cascaded snapshot environment.

18. The method of claim 16, wherein the undefined target device further comprises a track level sequence number data structure containing a respective track level sequence number for each track of the target device.

19. The method of claim 18, further comprising:
   comparing the track level sequence number for the selected track with the device level target sequence number of the undefined target device; and
   using the result of the comparison to determine whether data requested by the IO operation should be implemented by reading a back-end allocation of the undefined target device or by reading a location of the data identified by the respective direct image lookup entry.

* * * * *